US012659020B2

(12) United States Patent
Lin

(10) Patent No.: US 12,659,020 B2
(45) Date of Patent: Jun. 16, 2026

(54) METHOD AND APPARATUS FOR SATELLITE ACCESS NETWORK MEASUREMENT

(71) Applicant: MediaTek Inc., Hsinchu City (TW)

(72) Inventor: Hsuan-Li Lin, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 619 days.

(21) Appl. No.: 18/076,857

(22) Filed: Dec. 7, 2022

(65) Prior Publication Data

US 2023/0224025 A1     Jul. 13, 2023

Related U.S. Application Data

(60) Provisional application No. 63/297,843, filed on Jan. 10, 2022.

(51) Int. Cl.
*H04B 7/185* (2006.01)
*H04L 5/00* (2006.01)
(Continued)

(52) U.S. Cl.
CPC ....... *H04B 7/18519* (2013.01); *H04L 5/0048* (2013.01); *H04W 24/10* (2013.01); *H04W 56/001* (2013.01)

(58) Field of Classification Search
CPC ............ H04B 7/18519; H04B 7/18513; H04L 5/0048; H04W 24/10; H04W 56/001;
(Continued)

(56) References Cited

U.S. PATENT DOCUMENTS 6,369,754 B1 * 4/2002 Levanon ................... G01S 5/12
342/357.2
6,373,432 B1 * 4/2002 Rabinowitz ........ H04B 7/18552
342/357.29
(Continued)

FOREIGN PATENT DOCUMENTS

CN         112913301 A      6/2021
KR    20220094162 A  *  7/2022  ............ H04W 24/08
(Continued)

OTHER PUBLICATIONS

Mediatek Inc: "Efficient Configuration of SMTC and Measurement Gaps in NR-NTN", 3GPP Draft; R2-2100258, vol. RAN WG2, No. Online; Jan. 25, 2021-Feb. 5, 2021 Jan. 14, 2021 (Year: 2021).*
(Continued)

*Primary Examiner* — Yuwen Pan
*Assistant Examiner* — Swati Jain
(74) *Attorney, Agent, or Firm* — Andy M. Han; Han IP PLLC

(57) ABSTRACT

Various solutions for satellite access network (SAN) or non-terrestrial network (NTN) measurement with respect to user equipment and network apparatus in mobile communications are described. An apparatus may determine a first number of synchronization signal blocks (SSBs) or SSB-based radio resource management (RRM) measurement timing configurations (SMTCs) overlapped in a time domain. The apparatus may determine a second number of satellites to be measured in each of the SMTCs. The apparatus may calculate a scaling factor according to the first number and the second number. The apparatus may determine a measurement period by applying the scaling factor. The apparatus may perform measurements on the satellites within the measurement period.

18 Claims, 9 Drawing Sheets

1000

DETERMINE, BY A PROCESSOR OF AN APPARATUS, A FIRST NUMBER OF SYNCHRONIZATION SIGNAL BLOCKS (SSBs) OR SSB-BASED RADIO RESOURCE MANAGEMENT (RRM) MEASUREMENT TIMING CONFIGURATIONS (SMTCs) OVERLAPPED IN A TIME DOMAIN
1010

DETERMINE, BY THE PROCESSOR, A SECOND NUMBER OF SATELLITES TO BE MEASURED IN EACH OF THE SMTCs
1020

CALCULATE, BY THE PROCESSOR, A SCALING FACTOR ACCORDING TO THE FIRST NUMBER AND THE SECOND NUMBER
1030

DETERMINE, BY THE PROCESSOR, A MEASUREMENT PERIOD BY APPLYING THE SCALING FACTOR
1040

PERFORM, BY THE PROCESSOR, MEASUREMENTS ON THE SATELLITES WITHIN THE MEASUREMENT PERIOD
1050

(51) Int. Cl.
*H04W 24/10* (2009.01)
*H04W 56/00* (2009.01)

(58) Field of Classification Search
CPC ......... H04W 56/0035; H04W 56/0065; H04W 24/02; H04W 24/08
See application file for complete search history.

(56) References Cited

U.S. PATENT DOCUMENTS

| | | | | |
|---|---|---|---|---|
| 2001/0043641 | A1* | 11/2001 | Harms | H04B 1/707 375/130 |
| 2010/0289696 | A1* | 11/2010 | Krueger | G01S 19/20 342/357.58 |
| 2013/0271318 | A1* | 10/2013 | Doucet | G01S 19/44 342/357.64 |
| 2019/0313271 | A1* | 10/2019 | Yiu | H04W 72/04 |
| 2019/0373496 | A1* | 12/2019 | Cui | H04W 24/10 |
| 2021/0044371 | A1* | 2/2021 | Chen | H04J 13/0003 |
| 2021/0368374 | A1* | 11/2021 | Cheng | H04W 80/02 |
| 2021/0385765 | A1* | 12/2021 | Cheng | H04W 56/001 |
| 2023/0300700 | A1* | 9/2023 | Rune | H04W 48/16 370/329 |
| 2023/0308168 | A1* | 9/2023 | Määttänen | H04B 7/18519 |
| 2024/0022935 | A1* | 1/2024 | Li | H04W 24/08 |
| 2024/0049092 | A1* | 2/2024 | Määttänen | H04B 7/18541 |
| 2024/0297773 | A1* | 9/2024 | Huang | H04L 5/001 |
| 2024/0389041 | A1* | 11/2024 | Muhammad | H04W 56/005 |
| 2025/0254664 | A1* | 8/2025 | Cui | H04W 72/0446 |

FOREIGN PATENT DOCUMENTS

| | | | | | |
|---|---|---|---|---|---|
| WO | WO 2020069268 | A1 | 4/2020 | | |
| WO | WO 2020082211 | A1 | 4/2020 | | |
| WO | WO-2020088597 | A1 * | 5/2020 | ........... | H04W 24/10 |
| WO | WO-2023068990 | A1 * | 4/2023 | ......... | H04B 7/18513 |

OTHER PUBLICATIONS

Nokia et al: "On SMTC and measurement gaps for NTN", 3GPP Draft; R2-2100530, vol. RAN WG2, No. Electronic; Jan. 14, 2021 (Year: 2021).*

Nicolas Chuberre (Thales), "Status Report to TSG", 3GPP TSG RAN meeting #91-e, RP-210128, Electronic Meeting, Mar. 16-26, 2021 (Year: 2021).*

Taiwan Intellectual Property Office, Office Action in Taiwan Patent Application No. 112100456, Apr. 27, 2023.

European Patent Office, Extended European Search Report in European Patent Application No. 23150878.9, May 10, 2023.

Mediatek Inc.: "Efficient Configuration of SMTC and Measurement Gaps in NR-NTN", 3GPP TSG-RAN WG2 Meeting #113-e, R2-2100258, Online, Jan. 25-Feb. 5, 2021.

Nokia et al.: "On SMTC and measurements gaps for NTN", 3GPP TSG-RAN WG2 Meeting #113 Electronic, R2-2100530, Elbonia, Jan. 25-Feb. 5, 2021.

Nicolas Chuberre (Thales), "Status Report to TSG", 3GPP TSG RAN meeting #91-e, RP-210128, Electronic Meeting, Mar. 16-26, 2021.

* cited by examiner

301
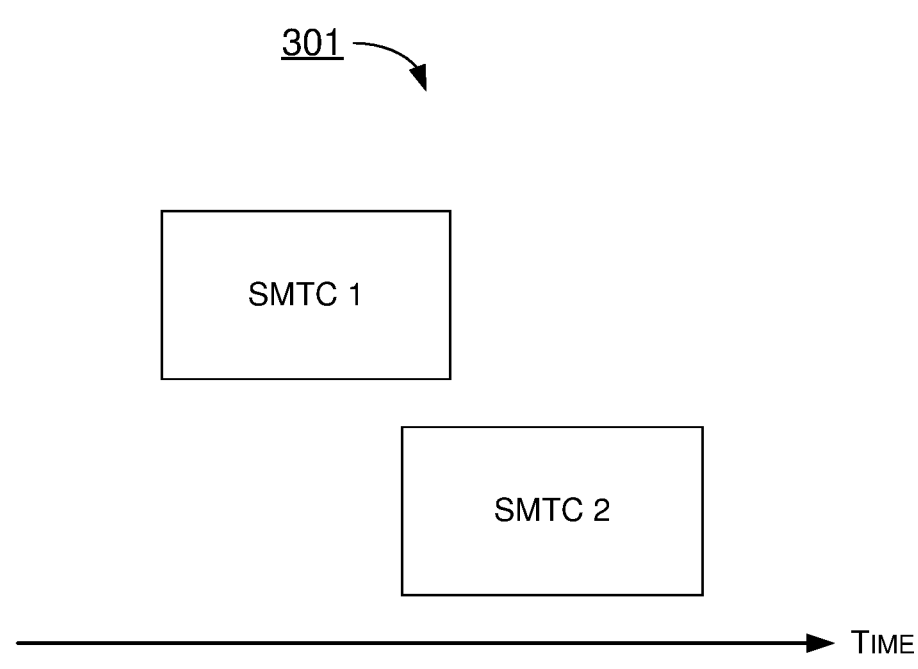
302
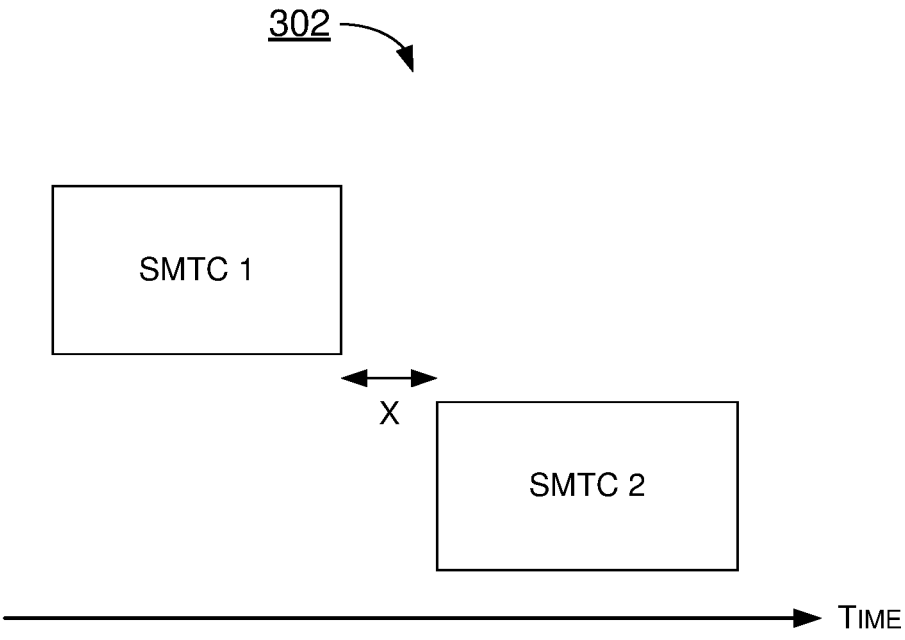
FIG. 3

400

601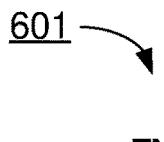

TN

Measurement period for inter-frequency measurements with gaps (Frequency FR1)

| DRX cycle | $T_{SSB\_measurement\_period\_inter}$ |
|---|---|
| No DRX | Max(200ms, Ceil(8 × $K_{gap}$) × Max(MGRP, SMTC period)) × $CSSF_{inter}$ |
| DRX cycle ⩽ 320ms | Max(200ms, Ceil(8 × 1.5 × $K_{gap}$) × Max(MGRP, SMTC period, DRX cycle)) × $CSSF_{inter}$ |
| DRX cycle > 320ms | Ceil(8 × $K_{gap}$) × DRX cycle × $CSSF_{inter}$ |

602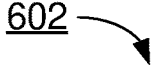

NTN

Measurement period for inter-frequency measurements with gaps (Frequency FR1)

| DRX cycle | $T_{SSB\_measurement\_period\_inter}$ |
|---|---|
| No DRX | Max(200ms, Ceil(8 × $K_{gap}$) × Max(MGRP, SMTC period)) × $\mathbf{P_{sat}}$ × $CSSF_{inter}$ |
| DRX cycle ⩽ 320ms | Max(200ms, Ceil(8 × 1.5 × $K_{gap}$) × Max(MGRP, SMTC period, DRX cycle)) × $\mathbf{P_{sat}}$ × $CSSF_{inter}$ |
| DRX cycle > 320ms | Ceil(8 × $K_{gap}$) × DRX cycle × $\mathbf{P_{sat}}$ × $CSSF_{inter}$ |

FIG. 6

701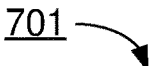

TN

Measurement period for intra-frequency measurements with gaps (Frequency FR1)

| DRX cycle | $T_{SSB\_measurement\_period\_intra}$ |
|---|---|
| No DRX | $Max(200ms, 5 \times Max(MGRP, SMTC\ period)) \times CSSF_{intra}$ |
| DRX cycle $\leqslant$ 320ms | $Max(200ms, Ceil(1.5 \times 5) \times Max(MGRP, SMTC\ period, DRX\ cycle)) \times CSSF_{intra}$ |
| DRX cycle > 320ms | $5 \times Max(MGRP, DRX\ cycle)) \times CSSF_{intra}$ |

702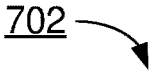

NTN

Measurement period for intra-frequency measurements with gaps (Frequency FR1)

| DRX cycle | $T_{SSB\_measurement\_period\_intra}$ |
|---|---|
| No DRX | $Max(200ms, 5 \times Max(MGRP, SMTC\ period)) \times P_{sat} \times CSSF_{intra}$ |
| DRX cycle $\leqslant$ 320ms | $Max(200ms, Ceil(1.5 \times 5) \times Max(MGRP, SMTC\ period, DRX\ cycle)) \times P_{sat} \times CSSF_{intra}$ |
| DRX cycle > 320ms | $5 \times Max(MGRP, DRX\ cycle)) \times P_{sat} \times CSSF_{intra}$ |

FIG. 7

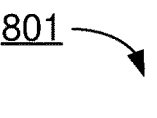

801

TN

Measurement period for intra-frequency measurements without gaps (Frequency FR1)

| DRX cycle | $T_{SSB\_measurement\_period\_intra}$ |
|---|---|
| No DRX | $Max(200ms, Ceil(5 \times K_p) \times SMTC\ period) \times CSSF_{intra}$ |
| DRX cycle $\leqslant$ 320ms | $Max(200ms, Ceil(1.5 \times 5 \times K_p) \times Max(SMTC\ period, DRX\ cycle)) \times CSSF_{intra}$ |
| DRX cycle > 320ms | $Ceil(5 \times K_p) \times DRX\ cycle) \times CSSF_{intra}$ |

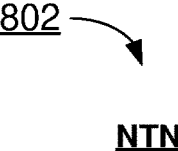

802

NTN

Measurement period for intra-frequency measurements without gaps (Frequency FR1)

| DRX cycle | $T_{SSB\_measurement\_period\_intra}$ |
|---|---|
| No DRX | $Max(200ms, Ceil(5 \times K_p) \times SMTC\ period) \times \mathbf{P_{sat}} \times CSSF_{intra}$ |
| DRX cycle $\leqslant$ 320ms | $Max(200ms, Ceil(1.5 \times 5 \times K_p) \times Max(SMTC\ period, DRX\ cycle)) \times \mathbf{P_{sat}} \times CSSF_{intra}$ |
| DRX cycle > 320ms | $Ceil(5 \times K_p) \times DRX\ cycle) \times \mathbf{P_{sat}} \times CSSF_{intra}$ |

FIG. 8

1000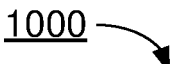

DETERMINE, BY A PROCESSOR OF AN APPARATUS, A
FIRST NUMBER OF SYNCHRONIZATION SIGNAL BLOCKS
(SSBs) OR SSB-BASED RADIO RESOURCE
MANAGEMENT (RRM) MEASUREMENT TIMING
CONFIGURATIONS (SMTCs) OVERLAPPED IN A TIME
DOMAIN
1010

DETERMINE, BY THE PROCESSOR, A SECOND NUMBER
OF SATELLITES TO BE MEASURED IN EACH OF THE
SMTCs
1020

CALCULATE, BY THE PROCESSOR, A SCALING FACTOR
ACCORDING TO THE FIRST NUMBER AND THE SECOND
NUMBER
1030

DETERMINE, BY THE PROCESSOR, A MEASUREMENT
PERIOD BY APPLYING THE SCALING FACTOR
1040

PERFORM, BY THE PROCESSOR, MEASUREMENTS ON
THE SATELLITES WITHIN THE MEASUREMENT PERIOD
1050

FIG. 10

METHOD AND APPARATUS FOR SATELLITE ACCESS NETWORK MEASUREMENT

CROSS REFERENCE TO RELATED PATENT APPLICATION(S)

The present disclosure claims the priority benefit of U.S. Provisional Patent Application No. 63/297,843, filed on 10 Jan. 2022. The contents of aforementioned applications are herein incorporated by reference in their entirety.

TECHNICAL FIELD

The present disclosure is generally related to mobile communications and, more particularly, to satellite access network (SAN) or non-terrestrial network (NTN) measurement with respect to user equipment (UE) and network apparatus in mobile communications.

BACKGROUND

Unless otherwise indicated herein, approaches described in this section are not prior art to the claims listed below and are not admitted as prior art by inclusion in this section.

In mobile/wireless communications, more and more attentions and participation were drawn into satellite communications, with companies and organizations convinced of the market potential for an integrated satellite and terrestrial network infrastructure in the context of $3^{rd}$ Generation Partnership Project (3GPP) 5G standards. Satellites refer to spaceborne vehicles in Low Earth Orbits (LEO), Medium Earth Orbits (MEO), Geostationary Earth Orbit (GEO) or in Highly Elliptical Orbits (HEO). 5G standards make Non-Terrestrial Networks (NTN), including satellite segments, a recognized part of 3GPP 5G connectivity infrastructure. A low earth orbit is an earth-centered orbit with an altitude of 2,000 km or less, or with a period of 128 minutes or less (i.e., making at least 11.25 orbits per day) and an eccentricity less than 0.25. Most of the artificial objects in outer space are in non-geostationary satellite orbit (NGSO) (e.g., LEO or MEO), with an altitude never more than about one-third of the radius of Earth. NGSO satellites orbit around the earth at a high speed (mobility), but over a predictable or deterministic orbit.

One of the challenges in NGSO communications is that the Doppler shift is huge since the NGSO satellites move at a high speed. The Doppler shift of a LEO-600 km network can be up to 24 parts per million (ppm). For example, in the 2 gigahertz (GHz) carrier, the maximum Doppler shift of a LEO satellite can be up to +/−48 kilohertz (kHz). Therefore, satellite/cell measurements in NGSO satellite-based NTN can be quite different from terrestrial networks. In terrestrial networks, cells/base stations are well synchronized in frequency and the Doppler shifts among cells/base stations are minor. No need to consider Doppler effect when performing measurements. However, in NTN or SAN, Doppler effect is significant and Doppler shifts among satellites/cells are large. This will cause additional burdens on the UE in processing frequency drifts when performing satellite/cell measurements. The capability/cost requirements including hardware and software for the UE will become more complex and expensive.

Accordingly, how to overcome large Doppler shifts becomes an important issue for satellite communications in the newly developed wireless communication network.

Therefore, there is a need to provide proper schemes to perform satellite/cell measurements without increasing UE burdens and requirements.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to SAN or NTN measurement with respect to user equipment and network apparatus in mobile communications.

In one aspect, a method may involve an apparatus determining a first number of synchronization signal blocks (SSBs) or SSB-based radio resource management (RRM) measurement timing configurations (SMTCs) overlapped in a time domain. The method may also involve the apparatus determining a second number of satellites to be measured in each of the SMTCs. The method may further involve the apparatus calculating a scaling factor according to the first number and the second number. The method may further involve the apparatus determining a measurement period by applying the scaling factor. The method may further involve the apparatus performing measurements on the satellites within the measurement period.

In one aspect, an apparatus may comprise a transceiver which, during operation, wirelessly communicates with at least one network node of a wireless network. The apparatus may also comprise a processor communicatively coupled to the transceiver. The processor, during operation, may perform operations comprising determining a first number of SMTCs overlapped in a time domain. The processor may also perform operations comprising determining a second number of satellites to be measured in each of the SMTCs. The processor may further perform operations comprising calculating a scaling factor according to the first number and the second number. The processor may further perform operations comprising determining a measurement period by applying the scaling factor. The processor may further perform operations comprising performing, via the transceiver, measurements on the satellites within the measurement period.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram depicting an example scenario under schemes in accordance with implementations of the present disclosure.

FIG. 6 is a diagram depicting example scenarios under schemes in accordance with implementations of the present disclosure.

FIG. 7 is a diagram depicting example scenarios under schemes in accordance with implementations of the present disclosure.

FIG. 8 is a diagram depicting example scenarios under schemes in accordance with implementations of the present disclosure.

FIG. 10 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview Implementations in accordance with the present disclosure relate to various techniques, methods, schemes and/or solutions pertaining to SAN or NTN measurement with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
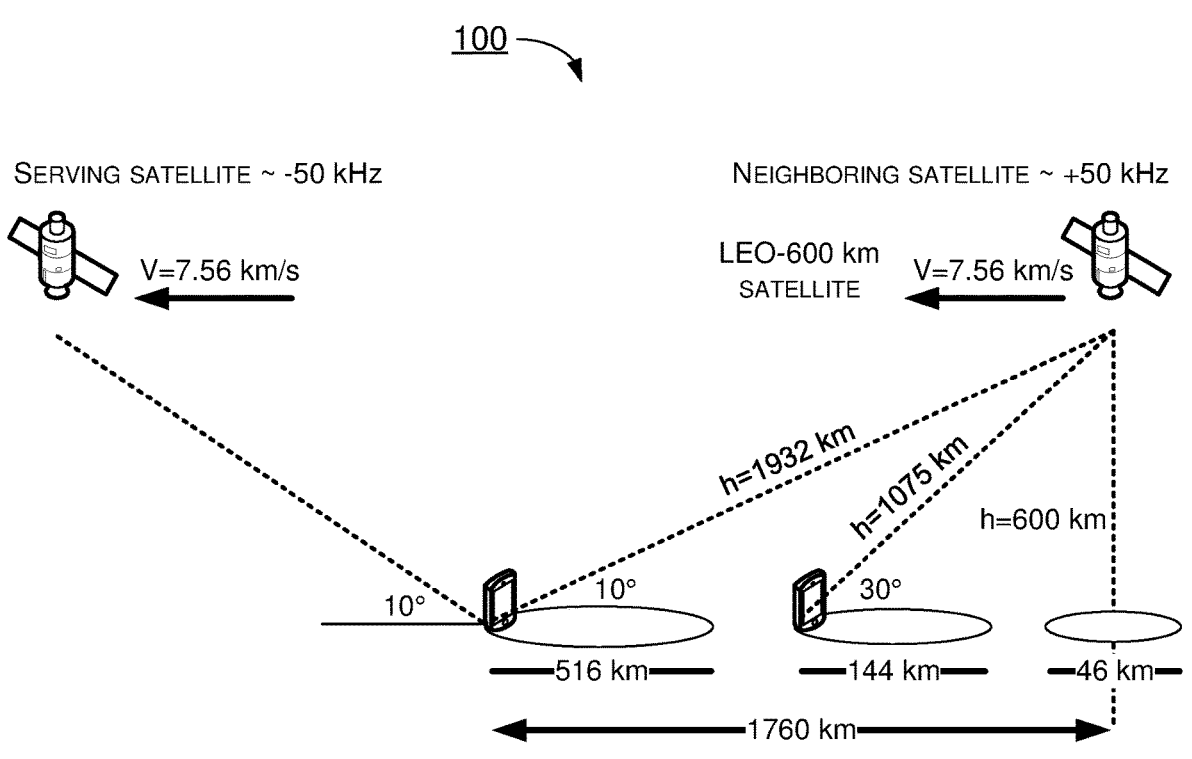
FIG. 1 is a diagram depicting an example scenario under schemes in accordance with implementations of the present disclosure.

According to the reference scenario parameters of Table 4.2-2 in 3GPP TR 38.821, the maximum Doppler shift of a LEO-600 km network can be up to 24 ppm. In addition, the Doppler of a serving satellite and a neighboring satellite may be with different signs (e.g., the serving satellite is leaving the UE while the neighboring cell is approaching to the UE). FIG. 1 illustrates an example scenario 100 under schemes in accordance with implementations of the present disclosure. Scenario 100 involves at least one UE and a plurality of network nodes (e.g., satellites), which may be a part of a wireless communication network (e.g., an LTE network, a 5G/NR network, an IoT network or a 6G network). As shown in FIG. 1, the satellites are deployed in LEO and orbit around the earth at a high speed. The UE on the ground needs to connect to a serving satellite for SAN or NTN communications. The UE may also need to perform some measurements on a neighboring satellite for mobility management. Under scenario 100, the UE is located between two satellites. Thus, the serving satellite is leaving the UE and the neighboring cell is approaching to the UE. The Doppler shift will become large/significant under such situation. For example, the Doppler shift of the serving satellite observed at the UE could be −50 kHz whereas the Doppler shift of the neighboring satellite observed at the UE could be +50 kHz. It leads up to around 100 kHz frequency separation between the serving satellite and the neighboring satellite.

Figure 2:
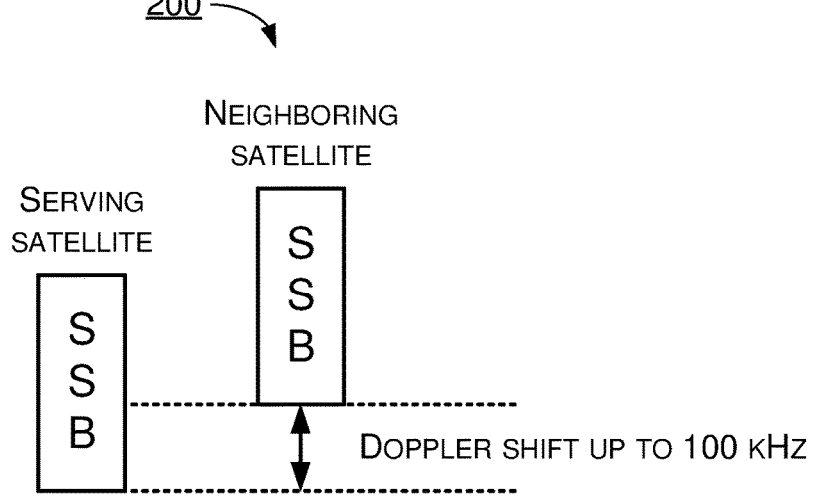
FIG. 2 is a diagram depicting an example scenario under schemes in accordance with implementations of the present disclosure.

FIG. 2 illustrates an example scenario 200 under schemes in accordance with implementations of the present disclosure. The Doppler shift between the reference signals (e.g., Synchronization Signal Block (SSB)) from the serving satellite and the neighboring satellite at 2 GHz can be up to 100 kHz. In other words, if two satellites are configured in one measurement object (MO) with the same absolute radio frequency channel number (ARFCN), up to 100 kHz Doppler shift can be observed. Therefore, extra hardware would be needed to receive/measure on different satellites. For example, the UE may need to be equipped with two transceivers to perform measurements on the neighboring satellite while connecting to the serving satellite. Additional hardware/software costs may be also needed for measuring/communicating with the two satellites at the same time.

In view of the above, the present disclosure proposes several schemes pertaining to measurements with respect to UE and network apparatus in SAN or NTN. According to the schemes of the present disclosure, some time-division multiplexing (TDM) manners may be introduced to resolve the aforementioned issues for perform serving cell/satellite measurement and neighboring cell/satellite measurement. The TDM manners may comprise using a scaling/sharing factor or a measurement restriction when performing the measurement. The UE may apply the scaling/sharing factor when some conditions are satisfied. The scaling/sharing factor is used to extend a measurement period. Thus, the UE may have more measurement time for performing measurements on different cells/satellites respectively rather than performing measurements on different cells/satellites simultaneously. Alternatively, the UE may apply the measurement restriction when some conditions are satisfied. The UE is not expected to perform measurement on the reference signal with the measurement restriction. With the measurement restriction, the conflict among different cells/satellites may be avoided. Accordingly, the UE is able to support SAN/NTN measurements on multiple cells/satellites and mobility performance without significant increase in UE measurement resources (e.g., hardware/software resources). Some balances can be reached between mobility performance and UE design costs.

Specifically, the UE may connect to a serving cell for data reception/transmission. The cell mentioned in the present disclosure may comprise a satellite, a network node or a base station. The serving cell may configure some frequency bands/points (e.g., via radio resource control (RRC) configuration) for the UE to perform measurements for possible neighboring cells or target cells. The measurements may be configured within a measurement gap (e.g., gap-based measurement) or outside a measurement gap (e.g., gap-less measurement). The measurements may be performed within the measurement gap in an event that the UE receives the measurement gap. The measurements may be performed outside the measurement gap in an event that the UE determine that no measurement gap is configured for the measurements. The measurements may comprise at least one of an intra-frequency measurement and an inter-frequency measurement.

For NTN/SAN measurement, the satellites are deployed in LEO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration from the serving satellite if any. Then, the UE needs to determine whether to perform a measurement for the neighboring satellite by determining whether the serving satellite and the neighboring satellite are different satellites. The neighboring satellite measurement may be an intra-frequency measurement and/or an inter-frequency measurement. After determining that the measurement for the neighboring satellite is needed, the UE needs to determine a measurement period for performing the measurement.

In determining the measurement period, the UE further need to determine a scaling factor. For determining the scaling factor, the UE may determine a first number of synchronization signal blocks (SSBs) or SSB-based radio resource management (RRM) measurement timing configurations (SMTCs) overlapped in the time domain. The SSBs or SMTCs overlapped in the time domain may comprise a first SSB or SMTC configured for a first satellite and a second SSB or SMTC configured for a second satellite different from the first satellite. The UE may determine that two SMTCs are overlapped in some scenarios. FIG. 3 illustrates example scenarios 301 and 302 under schemes in accordance with implementations of the present disclosure. As shown in scenario 301, the UE may determine that SMTC 1 and SMTC 2 are overlapped in a case that SMTC 1 and SMTC 2 are partially overlapped in the time domain. Alternatively, as shown in scenario 302, the UE may determine that SMTC 1 and SMTC 2 are overlapped in a case that a gap between SMTC 1 and SMTC 2 (e.g., X) is less than a pre-determined value (e.g., X<4 ms).

Figure 4:
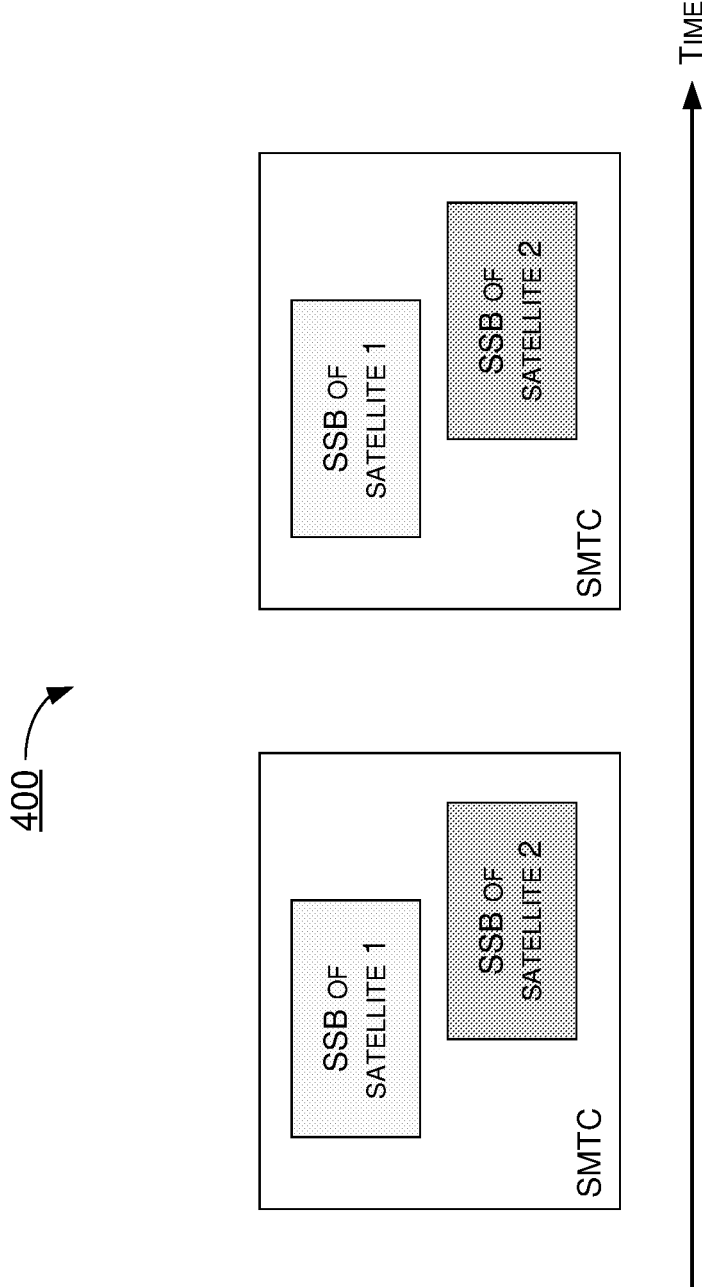
FIG. 4 is a diagram depicting an example scenario under schemes in accordance with implementations of the present disclosure.

Furthermore, the UE may determine a second number of satellites to be measured in each of the SMTCs. FIG. 4 illustrates an example scenario 400 under schemes in accordance with implementations of the present disclosure. In one SMTC, the UE may be configured to measure a first satellite (e.g., satellite 1) and a second satellite (e.g., satellite 2). The reference signals (e.g., SSBs) from the first satellite and the second satellite may be overlapped within the SMTC. The first satellite and the second satellite are different satellites. The UE may determine the number of satellites to be measured according to how many ephemerides provided in a measurement object (MO) configured by a network node.

Then, the UE may calculate the scaling factor according to the first number and the second number. For example, the UE may calculate the scaling factor by summing the second number in each of the SMTCs over the first number of SMTCs in total. If SMTCs do not overlap with each other, the scaling factor of the measurement period is K1, which can be represented by an equation of $$K1 = \left\lceil \frac{Num \ of \ LEO \ \text{satellites to be measured in the } SMTC}{\text{number of } LEO \ \text{satellites } UE \ \text{is}} \right\rceil.$$
$$\text{capable to measure in one } SMTC$$

If SMTCs overlap with each other, the scaling factor of the measurement period is K2, which can be represented by an equation of $$K2 = \sum_{i} \left\lceil \frac{Num \ of \ LEO \ \text{satellites to be measured in the } SMTC \ i}{\text{number of } LEO \ \text{satellites } UE \ \text{is}} \right\rceil$$
$$\text{capable to measure in one } SMTC$$

In one example, assuming that SMTC 1 is overlapped with SMTC 2. There is 1 satellited to be measured in SMTC 1 and there are 2 satellites to be measured in SMTC 2. Then, the scaling factor is determined by 1+2=3. In one example, the second number can be always one if the measurement target is served by geostationary satellite orbit (GSO) or GEO satellite.

After determining the scaling factor, the UE may determine a measurement period by applying the scaling factor. For example, the UE may be configured with a first measurement period when no SSBs or SMTCs are overlapped. In an event that SSBs or SMTCs to be measured are overlapped, the UE may determine a second measurement period by applying the scaling factor on the first measurement period. The second measurement period is greater than the first measurement period. Thus, the UE may have more time to perform the measurements when SSBs or SMTCs to be measured are overlapped.

Figure 5:
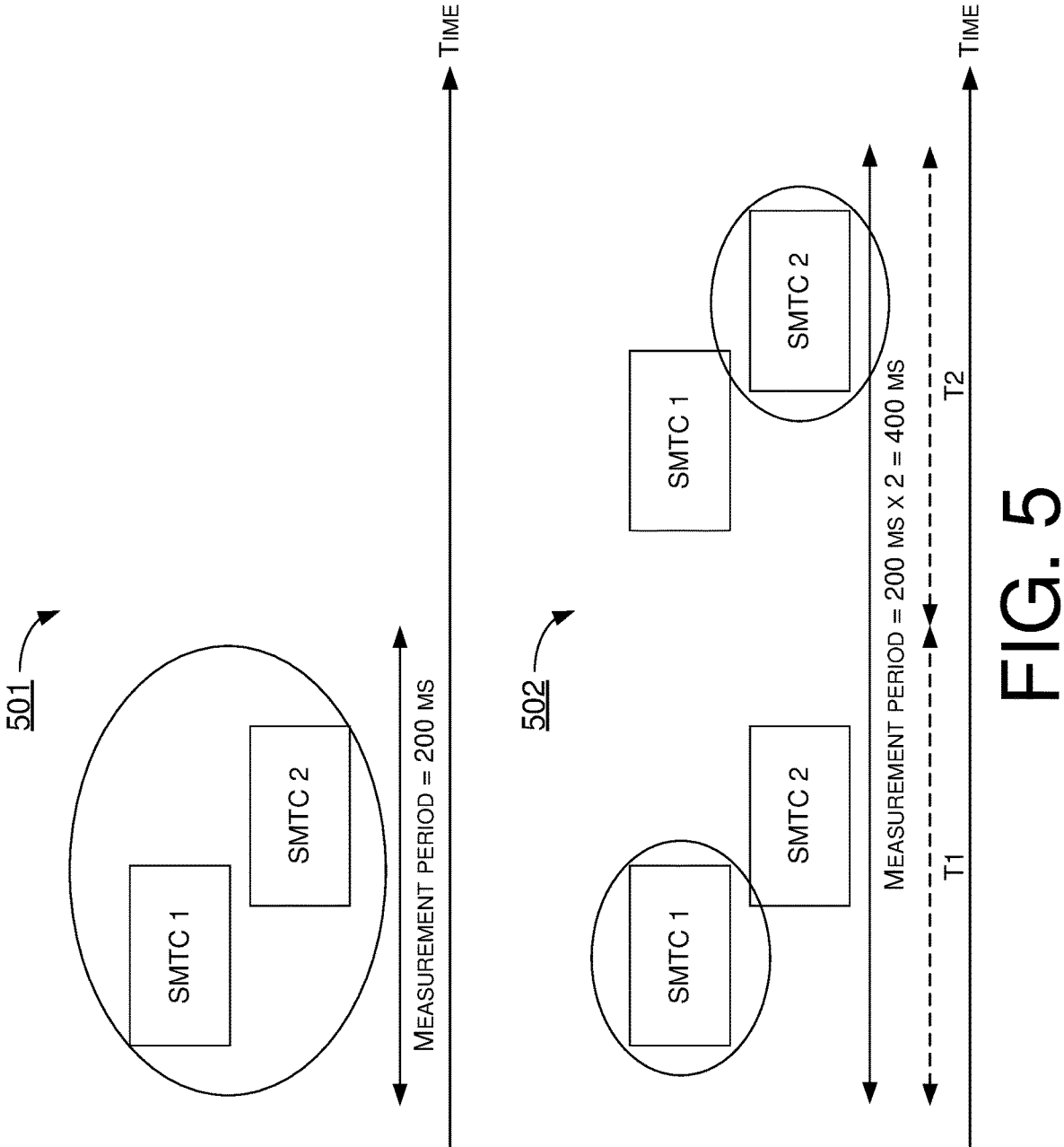
FIG. 5 is a diagram depicting example scenarios under schemes in accordance with implementations of the present disclosure.

After determining the measurement period, the UE may perform the measurements on the satellites within the measurement period. FIG. 5 illustrates example scenarios 501 and 502 under schemes in accordance with implementations of the present disclosure. In scenarios 501, the UE is configured with a first measurement period (e.g., 200 millisecond (ms)). There are two SMTCs (e.g., SMTC 1 and SMTC 2) to be measured within the first measurement period. In a case that the two SMTCs are overlapped with each other and the first measurement period is not long enough, the UE has to perform the measurements for the two SMTCs at the same time. This will cause significant burdens on UE complexity and measurement resources.

In scenarios 502, the UE may determine that two SMTCs (e.g., SMTC 1 and SMTC 2) are overlapped. Assuming that the number of satellites to be measured within each SMTC is one, the UE may determine that the scaling factor is 2 (e.g., 1+1=2). The UE may determine a second measurement period by apply the scaling factor on the first measurement period (e.g., 200 ms×2=400 ms). The second measurement period is two times longer than the first measurement period. Thus, the UE has enough time to perform measurement for one SMTC at one time.

The UE may perform the measurements for SMTC 1 and SMTC 2 respectively within the second measurement period. For example, the UE may perform measurement only for SMTC 1 in time period T1 and perform measurement only for SMTC 2 in time period T2. Thus, since the measurement period is extended, the UE is able to perform the measurements on the satellites within the measurement period by a time division multiplexing (TDM) manner. In other words, the UE only needs to perform measurement on one satellite per time within the measurement period. The measurements may comprise at least one of a serving satellite measurement and a neighboring satellite measurement in SAN or NTN. Accordingly, the UE does not need to perform measurements on different satellites at the same time. UE design complexity can be simplified and additional hardware/software costs can be avoided.

In some implementations, the UE may determine the scaling factor according to some other parameters. The parameters may comprise, for example but not limited to, at least one of a number of SMTC occasions within or outside a measurement gap, a number of SMTCs configured, a UE capability on support of number for SMTCs, a number of SMTCs overlapped in the time domain, a number of SSBs to be measured overlapped in the time domain, a number of satellite measurement occasions within or outside a measurement gap, a number of satellites to be measured, and a number of measurement cell groups overlapped in time domain. The number of measurement cell groups may be defied/determined by at least one of cells/beams transmitted within the same SMTC, cells/beams transmitted for the same satellite, cells/beams with similar or the same timing/Doppler shifts, cells/beams belonging to the same satellite, and cells/beams having similar or the same ephemeras information. Serving cells/beams and neighboring cells/beams may belong to different measurement cell groups. The scaling/sharing factor (e.g., $P_{sat}$) may be determined according to any single parameter or a combination of multiple parameters mentioned above. The scaling/sharing factor may be used to scale up the measurement period for the neighboring cells and/or the serving cells.

In some implementations, the UE may apply a measurement restriction when some conditions are satisfied. The UE will not perform measurement on the reference signals or within the time period with the measurement restriction. For example, the UE may apply the measurement restriction on at least one of reference signals transmitted within the same SMTC, reference signals transmitted for the same satellite, reference signals with similar or the same timing/Doppler shifts, reference signals belonging to the same satellite, and reference signals having similar or the same ephemeras information. The UE may also apply the measurement restriction according to whether the SMTCs are overlapped in time domain and/or a UE capability on support of number for SMTCs.

FIG. 6 illustrates example scenarios 601 and 602 under schemes in accordance with implementations of the present disclosure. Scenarios 601 and 602 involve at least one UE and a plurality of network nodes (e.g., satellites), which may be a part of a wireless communication network (e.g., an LTE network, a 5G/NR network, an IoT network or a 6G network). The satellites are deployed in LEO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration from the serving satellite. Then, the UE needs to determine whether to perform a measurement within the measurement gap (i.e., gap-based measurement) for the neighboring satellite by determining whether the serving satellite and the neighboring satellite are different satellites. The neighboring satellite measurement may be an inter-frequency measurement.

Once the UE determines that it needs to perform the neighboring satellite measurement, it may determine a measurement period for the measurement. Scenario 601 shows the measurement period for inter-frequency measurements with gaps for frequency range 1 (FR1) in the terrestrial network (TN). The UE may determine the measurement period (e.g., $T_{SSB\_measurement\_period\_inter}$) according to the equations in scenario 601. For example, different equations may be used for different DRX cycles (e.g., no DRX, DRX cycle ≤320 ms or DRX cycle >320 ms). These equations may consider the parameters comprising, for example but not limited to, measurement gap repetition period (MGRP), SMTC period, carrier specific scaling factor (CSSF), DRX cycle, etc.

For NTN or SAN measurements, the basic TN measurement period needs to be scaled up. The UE may determine a scaling factor (e.g., $P_{sat}$) for extending the basic TN measurement period. For example, the UE may determine that $P_{sat}$=the number of SMTC overlapped/partially overlapped in the time domain for all types of satellites (e.g., N4). In another example, the UE may determine that $P_{sat}$=the number of satellites (e.g., LEO/non-geostationary (NGSO) satellites) to be measured in the overlapped SMTC (e.g., N6). Alternatively, the UE may determine that $P_{sat}$=sum of P_i over the SMTC overlapped/partially overlapped in the time domain (e.g., N4), where P_i=N6 for a given SMTC_i. Then, the UE may determine the measurement period for NTN/SAN measurement by applying the scaling factor (e.g., $P_{sat}$) on the basic TN measurement period. Scenario 602 shows the measurement period for inter-frequency measurements with gaps for FR1 in the NTN/SAN. The scaling factor (e.g., $P_{sat}$) is introduced/added in the equations used for the TN measurement. The UE may scale up the basic TN measurement period by multiplying the scaling factor (e.g., $P_{sat}$) directly. After determining the measurement period, the UE may perform inter-frequency measurement within the corresponding measurement period.

FIG. 7 illustrates example scenarios 701 and 702 under schemes in accordance with implementations of the present disclosure. Scenarios 701 and 702 involve at least one UE and a plurality of network nodes (e.g., satellites), which may be a part of a wireless communication network (e.g., an LTE network, a 5G/NR network, an IoT network or a 6G network). The satellites are deployed in LEO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration from the serving satellite. Then, the UE needs to determine whether to perform a measurement within the measurement gap (i.e., gap-based measurement) for the neighboring satellite by determining whether the serving satellite and the neighboring satellite are different satellites. The neighboring satellite measurement may be an intra-frequency measurement. For example, the SSB from the neighboring satellite is outside an active bandwidth part (BWP).

Once the UE determines that it needs to perform the neighboring satellite measurement, it may determine a measurement period for the measurement. Scenario 701 shows the measurement period for intra-frequency measurements with gaps for FR1 in the TN. The UE may determine the measurement period (e.g., $T_{SSB\_measurement\_period\_intra}$) according to the equations in scenario 701. For example, different equations may be used for different DRX cycles (e.g., no DRX, DRX cycle ≤320 ms or DRX cycle >320 ms). These equations may consider the parameters comprising, for example but not limited to, MGRP, SMTC period, CSSF, DRX cycle, etc.

For NTN or SAN measurements, the basic TN measurement period needs to be scaled up. The UE may determine a scaling factor (e.g., $P_{sat}$) for extending the basic TN measurement period. For example, the UE may determine that $P_{sat}$=the number of SMTC/satellites/measurement cell groups within the measurement gap or determine $P_{sat}$ according to at least one of the parameters mentioned above. Then, the UE may determine the measurement period for NTN/SAN measurement by applying the scaling factor (e.g., $P_{sat}$) on the basic TN measurement period. Scenario 702 shows the measurement period for intra-frequency measurements with gaps for FR1 in the NTN/SAN. The scaling factor (e.g., $P_{sat}$) is introduced/added in the equations used for the TN measurement. The UE may scale up the basic TN measurement period by multiplying the scaling factor (e.g., $P_{sat}$) directly. After determining the measurement period, the UE may perform intra-frequency measurement within the corresponding measurement period.

FIG. 8 illustrates example scenarios 801 and 802 under schemes in accordance with implementations of the present disclosure. Scenarios 801 and 802 involve at least one UE and a plurality of network nodes (e.g., satellites), which may be a part of a wireless communication network (e.g., an LTE network, a 5G/NR network, an IoT network or a 6G network). The satellites are deployed in LEO and orbit around the earth at a high speed. The UE on the ground connects to a serving satellite for SAN or NTN communications. The UE needs to perform measurements on a neighboring satellite for mobility management. At first, the UE may receive a first ephemeris of the serving satellite and a second ephemeris of the neighboring satellite. The UE may further receive a measurement gap configuration from the serving satellite if any. Then, the UE needs to determine whether to perform a measurement outside the measurement gap (i.e., gap-less measurement) for the neighboring satellite by determining whether the serving satellite and the neighboring satellite are different satellites. The neighboring satellite measurement may be an intra-frequency measurement or an inter-frequency measurement.

Once the UE determines that it needs to perform the neighboring satellite measurement outside/without the measurement gap, it may determine a measurement period for the measurement. Scenario 801 shows the measurement period for intra-frequency measurements without gaps for FR1 in the TN. The UE may determine the measurement period (e.g., $T_{SSB\_measurement\_period\_intra}$) according to the equations in scenario 801. For example, different equations may be used for different DRX cycles (e.g., no DRX, DRX cycle ≤320 ms or DRX cycle >320 ms). These equations may consider the parameters comprising, for example but not limited to, MGRP, SMTC period, CSSF, DRX cycle, etc.

For NTN or SAN measurements, the basic TN measurement period outside/without the measurement gap needs to be scaled up. The UE may determine a scaling factor (e.g., $P_{sat}$) for extending the basic TN measurement period. For example, the UE may determine that $P_{sat}$=the number of SMTC/satellites/measurement cell groups within the measurement gap or determine $P_{sat}$ according to at least one of the parameters mentioned above. Then, the UE may determine the measurement period for NTN/SAN measurement by applying the scaling factor (e.g., $P_{sat}$) on the basic TN measurement period. Scenario 802 shows the measurement period for intra-frequency measurements without gaps for FR1 in the NTN/SAN. The scaling factor (e.g., $P_{sat}$) is introduced/added in the equations used for the TN measurement. The UE may scale up the basic TN measurement period outside/without the measurement gap by multiplying the scaling factor (e.g., $P_{sat}$) directly. After determining the measurement period, the UE may perform intra-frequency measurement within the corresponding measurement period.

In some implementations, the UE may receive a first ephemeris of the serving satellite and a second ephemeris of the neighboring satellite. The UE may further receive a measurement gap configuration from the serving satellite if any. Then, the UE needs to determine whether to perform a measurement within the measurement gap (i.e., gap-based measurement) or outside the measurement gap (i.e., gap-less measurement) for the neighboring satellite by determining whether the serving satellite and the neighboring satellite are different satellites. The neighboring satellite measurement may be an intra-frequency measurement or an inter-frequency measurement.

Once the UE determines that it needs to perform the neighboring satellite measurement outside/without the measurement gap, it may determine a measurement period for the measurement. For NTN or SAN measurements, the reference signals from different satellites may overlapped with each other. The UE may determine a scheduling restriction for performing measurement for one satellite at one time. For example, the UE may determine the measurement restriction when the reference signals in the same orthogonal frequency division multiplexing (OFDM) symbol are belonging to different SMTCs/satellites/measurement cell groups. Then, the UE may measure one of but not both reference signals within the measurement period. The UE is not expected to measure the reference signal with the measurement restriction. The reference signal may comprise at least one of SSB and Channel State Information-Reference Signal (CSI-RS).

Illustrative Implementations

Figure 9:
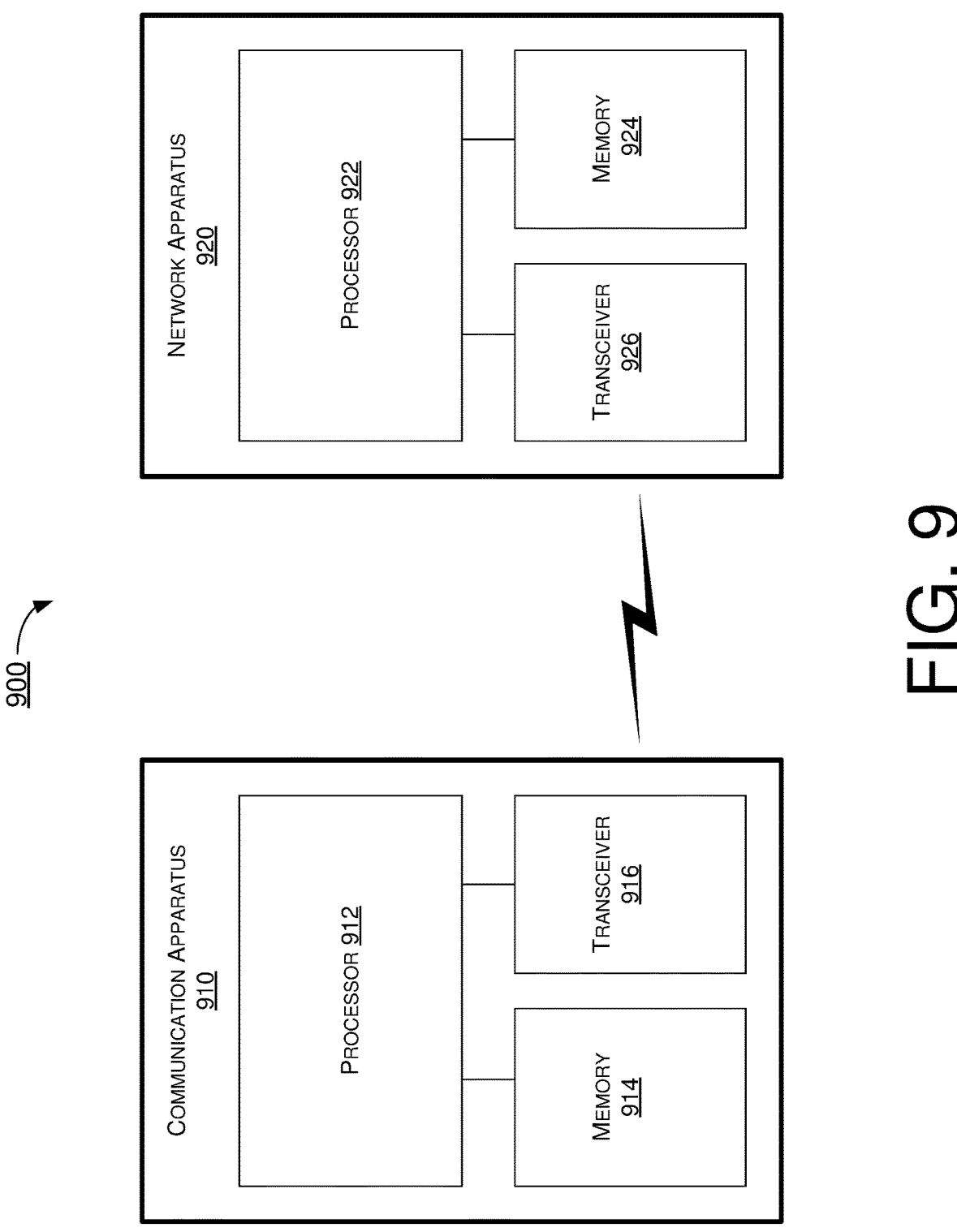
FIG. 9 is a block diagram of an example communication system in accordance with an implementation of the present disclosure.

FIG. 9 illustrates an example communication system 900 having an example communication apparatus 910 and an example network apparatus 920 in accordance with an implementation of the present disclosure. Each of communication apparatus 910 and network apparatus 920 may perform various functions to implement schemes, techniques, processes and methods described herein pertaining to SAN or NTN measurement with respect to user equipment and network apparatus in mobile communications, including scenarios/schemes described above as well as process 1000 described below.

Communication apparatus 910 may be a part of an electronic apparatus, which may be a UE such as a portable or mobile apparatus, a wearable apparatus, a wireless communication apparatus or a computing apparatus. For instance, communication apparatus 910 may be implemented in a smartphone, a smartwatch, a personal digital assistant, a digital camera, or a computing equipment such as a tablet computer, a laptop computer or a notebook computer. Communication apparatus 910 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 910 may be implemented in a smart thermostat, a smart fridge, a smart door lock, a wireless speaker or a home control center. Alternatively, communication apparatus 910 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 9 such as a processor 912, for example. Communication apparatus 910 may further include one or more other components not pertinent to the proposed scheme of the present disclosure (e.g., internal power supply, display device and/or user interface device), and, thus, such component(s) of communication apparatus 910 are neither shown in FIG. 9 nor described below in the interest of simplicity and brevity.

Network apparatus 920 may be a part of a network apparatus, which may be a network node such as a satellite, a base station, a small cell, a router or a gateway. For instance, network apparatus 920 may be implemented in an eNodeB in an LTE network, in a gNB in a 5G/NR, IoT, NB-IoT or IIoT network or in a satellite or base station in a 6G network. Alternatively, network apparatus 920 may be implemented in the form of one or more IC chips such as, for example and without limitation, one or more single-core processors, one or more multi-core processors, or one or more RISC or CISC processors. Network apparatus 920 may include at least some of those components shown in FIG. 9 such as a processor 922, for example. Network apparatus 920 may further include one or more other components not pertinent to the proposed scheme of the present disclosure (e.g., internal power supply, display device and/or user interface device), and, thus, such component(s) of network apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including autonomous reliability enhancements in a device (e.g., as represented by communication apparatus 910) and a network (e.g., as represented by network apparatus 920) in accordance with various implementations of the present disclosure.

In some implementations, communication apparatus 910 may also include a transceiver 916 coupled to processor 912 and capable of wirelessly transmitting and receiving data. In some implementations, communication apparatus 910 may further include a memory 914 coupled to processor 912 and capable of being accessed by processor 912 and storing data therein. In some implementations, network apparatus 920 may also include a transceiver 926 coupled to processor 922 and capable of wirelessly transmitting and receiving data. In some implementations, network apparatus 920 may further include a memory 924 coupled to processor 922 and capable of being accessed by processor 922 and storing data therein. Accordingly, communication apparatus 910 and network apparatus 920 may wirelessly communicate with each other via transceiver 916 and transceiver 926, respectively. To aid better understanding, the following description of the operations, functionalities and capabilities of each of communication apparatus 910 and network apparatus 920 is provided in the context of a mobile communication environment in which communication apparatus 910 is implemented in or as a communication apparatus or a UE and network apparatus 920 is implemented in or as a network node of a communication network.

In some implementations, processor 912 may determine a first number of SMTCs overlapped in the time domain. Processor 912 may further determine a second number of satellites to be measured in each of the SMTCs. Processor 912 may calculate a scaling factor according to the first number and the second number. Then, processor 912 may determine a measurement period by applying the scaling factor. Processor 912 may perform measurements on the satellites within the measurement period.

In some implementations, processor 912 may perform the measurements on the satellites within the measurement period by a TDM manner.

In some implementations, processor 912 may calculate the scaling factor by summing the second number in each of the SMTCs over the first number of SMTCs in total.

In some implementations, processor 912 may receive, via the transceiver 916, a first ephemeris of a serving satellite and a second ephemeris of the neighboring satellite. Processor 912 may determine that the serving satellite and the neighboring satellite are different satellite s according to the first ephemeris and the second ephemeris.

In some implementations, the SSBs or SMTCs overlapped in the time domain may comprise a first SSB or SMTC configured for a first satellite and a second SSB or SMTC configured for a second satellite different from the first satellite.

In some implementations, the measurements performed by processor 912 may comprise at least one of an intra-frequency measurement and an inter-frequency measurement.

In some implementations, processor 912 may determine that a first SSB or SMTC is overlapped with a second SSB or SMTC in the time domain in an event that a gap between the first SSB or SMTC and the second SSB or SMTC is less than a pre-determined value.

In some implementations, processor 912 may receive, via the transceiver 916, a measurement gap. Processor 912 may perform the measurements within the measurement gap.

In some implementations, processor 912 may determine that no measurement gap is configured for the measurements. Processor 912 may perform the measurements outside the measurement gap.

In some implementations, the measurements performed by processor 912 may comprise at least one of a serving satellite measurement and a neighboring satellite measurement in an SAN or an NTN.

Illustrative Processes

FIG. 10 illustrates an example process 1000 in accordance with an implementation of the present disclosure. Process 1000 may be an example implementation of above scenarios/schemes, whether partially or completely, with respect to SAN or NTN measurement with the present disclosure. Process 1000 may represent an aspect of implementation of features of communication apparatus 910. Process 1000 may include one or more operations, actions, or functions as illustrated by one or more of blocks 1010, 1020, 1030, 1040 and 1050. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 910 or any suitable UE or machine type devices. Solely for illustrative purposes and without limitation, process 1000 is described below in the context of communication apparatus 910. Process 1000 may begin at block 1010.

At 1010, process 1000 may involve processor 912 of communication apparatus 910 determining a first number of SMTCs overlapped in a time domain. Process 1000 may proceed from 1010 to 1020.

At 1020, process 1000 may involve processor 912 determining a second number of satellites to be measured in each of the SMTCs. Process 1000 may proceed from 1020 to 1030.

At 1030, process 1000 may involve processor 912 calculating a scaling factor according to the first number and the second number. Process 1000 may proceed from 1030 to 1040.

At 1040, process 1000 may involve processor 912 determining a measurement period by applying the scaling factor. Process 1000 may proceed from 1040 to 1050.

At 1050, process 1000 may involve processor 912 performing measurements on the satellites within the measurement period.

In some implementations, process 1000 may further involve processor 912 performing the measurements on the satellites within the measurement period by a TDM manner.

In some implementations, process 1000 may further involve processor 912 calculating the scaling factor by summing the second number in each of the SMTCs over the first number of SMTCs in total.

In some implementations, process 1000 may further involve processor 912 receiving a first ephemeris of a serving satellite and a second ephemeris of the neighboring satellite and determining that the serving satellite and the neighboring satellite are different satellite s according to the first ephemeris and the second ephemeris.

In some implementations, process 1000 may further involve processor 912 determining that a first SSB or SMTC is overlapped with a second SSB or SMTC in the time domain in an event that a gap between the first SSB or SMTC and the second SSB or SMTC is less than a predetermined value.

In some implementations, process 1000 may further involve processor 912 receiving a measurement gap and performing the measurements within the measurement gap.

In some implementations, process 1000 may further involve processor 912 determining that no measurement gap is configured for the measurements and performing the measurements outside the measurement gap.

In some implementations, process 1000 may further involve processor 912 performing at least one of a serving satellite measurement and a neighboring satellite measurement in an SAN or an NTN.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, a first number of synchronization signal blocks (SSBs) or SSB-based radio resource management (RRM) measurement timing configurations (SMTCs) overlapped in a time domain;
   determining, by the processor, a second number of satellites to be measured in each of the SMTCs;
   calculating, by the processor, a scaling factor according to the first number and the second number;
   extending, by the processor, a measurement period by applying the scaling factor; and
   performing, by the processor, measurements on the satellites within the measurement period,
   wherein the measurement period is configured with a value to be applied when no SSBs or SMTCs are overlapped in the time domain, and
   wherein the scaling factor is calculated by individually deriving a measurement load ratio for each of the SMTCs and summing the derived measurement load ratios, the measurement load ratio of a given SMTC among the SMTCs is defined as a number of satellites to be measured in the given SMTC divided by a number of satellites that the apparatus is capable of measuring within one SMTC, and the measurement period is extended by multiplying the value by the scaling factor.

2. The method of claim 1, wherein the performing comprises performing the measurements on the satellites within the measurement period by a time division multiplexing (TDM) manner.

3. The method of claim 1, wherein the SSBs or SMTCs overlapped in the time domain comprises a first SSB or SMTC configured for a first satellite and a second SSB or SMTC configured for a second satellite different from the first satellite.

4. The method of claim 1, wherein the measurements comprise at least one of an intra-frequency measurement and an inter-frequency measurement.

5. The method of claim 1, wherein the measurements comprise at least one of a serving satellite measurement and a neighboring satellite measurement in a satellite access network (SAN) or a non-terrestrial network (NTN).

6. The method of claim 1, further comprising:
   receiving, by the processor, a first ephemeris of a serving satellite and a second ephemeris of a neighboring satellite; and
   determining, by the processor, that the serving satellite and the neighboring satellite are different satellites according to the first ephemeris and the second ephemeris.

7. The method of claim 1, further comprising:
   determining, by the processor, that a first SSB or SMTC is overlapped with a second SSB or SMTC in the time domain in an event that a gap between the first SSB or SMTC and the second SSB or SMTC is less than a pre-determined value.

8. The method of claim 1, further comprising:
   receiving, by the processor, a configuration of a measurement gap,
   wherein the measurements are performed within the measurement gap.

9. The method of claim 1, further comprising:
   determining, by the processor, that no measurement gap is configured for the measurements,
   wherein the measurements are performed outside the measurement gap.

10. An apparatus, comprising:
    a transceiver which, during operation, wirelessly communicates with at least one network node of a wireless network; and
    a processor communicatively coupled to the transceiver such that, during operation, the processor performs operations comprising:
    determining a first number of synchronization signal blocks (SSBs) or SSB-based radio resource management (RRM) measurement timing configurations (SMTCs) overlapped in a time domain;
    determining a second number of satellites to be measured in each of the SMTCs;
    calculating a scaling factor according to the first number and the second number;
    extending a measurement period by applying the scaling factor; and
    performing, via the transceiver, measurements on the satellites within the measurement periods
    wherein the measurement period is configured with a value to be applied when no SSBs or SMTCs are overlapped in the time domain, and
    wherein the scaling factor is calculated by individually deriving a satellite measurement load ratio for each of the SMTCs and summing the derived satellite measurement load ratios, the satellite measurement load ratio of a given SMTC among the SMTCs is defined as a number of satellites to be measured in the given SMTC divided by a number of satellites that the apparatus is capable of measuring within one SMTC, and the measurement period is extended by multiplying the value by the scaling factor.

11. The apparatus of claim 10, wherein, in performing the measurements, the processor performs the measurements on the satellites within the measurement period by a time division multiplexing (TDM) manner.

12. The apparatus of claim 10, wherein the SSBs or SMTCs overlapped in the time domain comprises a first SSB or SMTC configured for a first satellite and a second SSB or SMTC configured for a second satellite different from the first satellite.

13. The apparatus of claim 10, wherein the measurements comprise at least one of an intra-frequency measurement and an inter-frequency measurement.

14. The apparatus of claim 10, wherein the measurements comprise at least one of a serving satellite measurement and a neighboring satellite measurement in a satellite access network (SAN) or a non-terrestrial network (NTN).

15. The apparatus of claim 10, wherein, during operation, the processor further performs operations comprising:

receiving, via the transceiver, a first ephemeris of a serving satellite and a second ephemeris of a neighboring satellite; and determining that the serving satellite and the neighboring satellite are different satellite s according to the first ephemeris and the second ephemeris.

16. The apparatus of claim 10, wherein, during operation, the processor further performs operations comprising:

determining that a first SSB or SMTC is overlapped with a second SSB or SMTC in the time domain in an event that a gap between the first SSB or SMTC and the second SSB or SMTC is less than a pre-determined value.

17. The apparatus of claim 10, wherein, during operation, the processor further performs operations comprising:

receiving, via the transceiver, a configuration of a measurement gap, wherein the measurements are performed within the measurement gap.

18. The apparatus of claim 10, wherein, during operation, the processor further performs operations comprising:

determining that no measurement gap is configured for the measurements, wherein the measurements are performed outside the measurement gap.

* * * * *